US007992187B2

(12) United States Patent
Chiao

(10) Patent No.: US 7,992,187 B2
(45) Date of Patent: Aug. 2, 2011

(54) SYSTEM AND METHOD OF DUAL-SCREEN INTERACTIVE DIGITAL TELEVISION

(75) Inventor: Hsin-Ta Chiao, Nantou (TW)

(73) Assignee: Industrial Technology Research Institute, Hsinchu (TW)

( * ) Notice: Subject to any disclaimer, the term of this patent is extended or adjusted under 35 U.S.C. 154(b) by 430 days.

(21) Appl. No.: 11/863,248

(22) Filed: Sep. 28, 2007

(65) Prior Publication Data

US 2008/0284907 A1    Nov. 20, 2008

(30) Foreign Application Priority Data

May 15, 2007  (TW) ................................ 96117230 A

(51) Int. Cl.
*H04N 7/16*    (2011.01)
(52) U.S. Cl. ........ 725/153; 725/141; 348/734; 715/238; 715/252; 715/718
(58) Field of Classification Search .................... 725/80, 725/81, 82, 133, 141, 153; 715/238, 252, 715/716–719; 348/734
See application file for complete search history.

(56) References Cited

U.S. PATENT DOCUMENTS

| | | | | |
|---|---|---|---|---|
| 5,831,664 | A | 11/1998 | Wharton et al. ............... | 348/13 |
| 6,064,420 | A | 5/2000 | Harrison et al. ............... | 348/12 |
| 6,097,441 | A * | 8/2000 | Allport ........................ | 348/552 |
| 6,567,984 | B1 * | 5/2003 | Allport ........................ | 725/110 |
| 6,765,557 | B1 * | 7/2004 | Segal et al. .................... | 345/173 |
| 6,882,352 | B2 * | 4/2005 | Terakado et al. ............. | 715/717 |
| 7,047,554 | B1 * | 5/2006 | Lortz ............................ | 725/149 |
| 7,162,733 | B2 * | 1/2007 | Kamieniecki ................. | 725/133 |
| 7,213,254 | B2 * | 5/2007 | Koplar et ...................... | 725/23 |
| 7,269,843 | B2 * | 9/2007 | Yamaguchi et al. ........... | 725/141 |
| 7,337,461 | B2 * | 2/2008 | Imada et al. .................. | 725/120 |
| 7,398,541 | B2 * | 7/2008 | Bennington et al. ........... | 725/40 |
| 7,539,472 | B2 * | 5/2009 | Sloo ............................ | 455/151.1 |
| 2002/0056112 | A1 | 5/2002 | Dureau et al. ................. | 725/78 |
| 2002/0122137 | A1 * | 9/2002 | Chen et al. .................... | 348/552 |
| 2002/0162121 | A1 | 10/2002 | Mitchell ...................... | 725/135 |
| 2003/0115599 | A1 | 6/2003 | Bennington et al. | |

(Continued)

FOREIGN PATENT DOCUMENTS

EP    1455532    9/2004

(Continued)

OTHER PUBLICATIONS

A metadata model supporting scalable interactive TV services, Gwenael Durand et al., Proceedings of the 11th International Multimedia Modelling Conference, 2005 IEEE.

(Continued)

Primary Examiner — Andrew Koenig
Assistant Examiner — Jason J Chung

(57) ABSTRACT

Disclosed is a system and method of dual-screen interactive digital television (IDTV), which is implemented by applying modality-independent remote console technology. The system has two ends, referred to as host IDTV and handheld device. The host IDTV includes a host IDTV content, an IDTV middleware, a host graphic user interface (host GUI), and a server-side remote console control protocol. The handheld device includes a handheld IDTV content, an interface generator, a handheld GUI, and a client-side remote console control protocol. In the invention, the DTV content may only have a dual-screen execution mode. The DTV content may also switch between single-screen and dual-screen modes.

29 Claims, 13 Drawing Sheets

U.S. PATENT DOCUMENTS

| | | | |
|---|---|---|---|
| 2005/0066370 A1* | 3/2005 | Alvarado et al. | 725/80 |
| 2005/0071879 A1* | 3/2005 | Haldavnekar et al. | 725/81 |
| 2005/0097444 A1* | 5/2005 | Ivarsey et al. | 715/501.1 |
| 2005/0097611 A1* | 5/2005 | Kim | 725/81 |
| 2005/0108751 A1* | 5/2005 | Dacosta | 725/39 |
| 2005/0110909 A1* | 5/2005 | Staunton et al. | 348/734 |
| 2005/0132420 A1* | 6/2005 | Howard et al. | 725/135 |
| 2005/0177861 A1 | 8/2005 | Ma et al. | 725/135 |
| 2005/0235294 A1* | 10/2005 | Kimura et al. | 719/328 |
| 2005/0246747 A1 | 11/2005 | Braun et al. | 725/81 |
| 2005/0278451 A1* | 12/2005 | Yamashita | 709/229 |
| 2006/0035587 A1* | 2/2006 | Shimizu | 455/3.06 |
| 2006/0101498 A1* | 5/2006 | Arling et al. | 725/81 |
| 2006/0161951 A1* | 7/2006 | Hindle et al. | 725/46 |
| 2006/0184974 A1* | 8/2006 | Sakao et al. | 725/80 |
| 2006/0218490 A1* | 9/2006 | Fink | 715/517 |
| 2008/0270890 A1* | 10/2008 | Stern | 715/239 |

FOREIGN PATENT DOCUMENTS

| | | |
|---|---|---|
| EP | 1659487 | 5/2006 |
| WO | WO 02/080555 | 10/2002 |
| WO | WO 2006095290 A2 * | 9/2006 |

OTHER PUBLICATIONS

Dual Device User Interface Design: PDAs and Interactive Television, Scott Robertson et al., CHI 96 Vancouver, BC Canada, 1996 ACM 0-89791-777-4/96/04.

Yuichi Yagawa, "How the Web improves Human Television Interaction," Proc of W3C Workship on Television and the Web, 1998.

IDTV Broadcast Applications for a Handheld Device, Matthew Ma et al., IEEE Communications Society, 2004 IEEE.

Main HCI Issues for the Design of Interfaces for Ubiquitous Interactive Multimedia Broadcast, Anxo Cereijo Roibas et al., interactions/ Mar.+Apr. 2004.

* cited by examiner

SYSTEM AND METHOD OF DUAL-SCREEN INTERACTIVE DIGITAL TELEVISION

FIELD OF THE INVENTION

The present invention generally relates to a system and method of dual-screen interactive digital television (IDTV), and more specifically to a system and method of dual-screen IDTV implemented by modality-independent remote console technology.

BACKGROUND OF THE INVENTION

The IDTV implies that the audience not only can watch the video of a digital TV program, but also can control the IDTV contents attached in the program through the remote control, keyboard, or mouse. The IDTV contents may be computer program codes, or data in some formats. For example, the digital video broadcasting (DVB) standard association in Europe proposed the Multimedia Home Platform (MHP), which uses IDTV contents of Java program code. European Telecommunication Standards Institute (ETSI) proposed Worldwide TV Markup Language (WTVML), which uses eXtensible Markup Language (XML) as the IDTV content format. The conventional IDTV is designed for a single screen, and the IDTV contents and digital TV program videos share the same screen space.

On the other hand, the dual-screen IDTV system implies that the audience has a shared screen which is only for displaying the videos, and is located at the host IDTV end. FIG. 1 shows a schematic view of an exemplary dual-screen IDTV. As shown in FIG. 1, host IDTV 101 may be the combination of a set-top box and a TV screen, an integrated digital TV, or the combination of a PC and a monitor. In addition, each audience has a handheld device, marked as 105a-105d. The handheld device may be PDA or smart phone.

In the dual-screen IDTV, host IDTV 101 and handheld devices 105a-105d use wired or wireless transmission medium for communication. The dual-screen IDTV allows each audience to use the handheld device to select the DTV contents. In principle, only one video of the DTV contents can be displayed on the display of the host IDTV.

FIG. 2 shows the structure and the operation of an exemplary dual-screen IDTV. As shown in FIG. 2, DTV content 204 is transmitted by application service provider (ASP) 201 to broadcaster 203. Broadcaster 203 may be terrestrial digital TV station, cable multiple service operator (MSO), satellite digital TV station, or IPTV operator. Broadcaster 203 uses MPEG-2 or IP protocols to broadcast or multicast DTV contents 204 through terrestrial radio, cable, satellite, or broadband network to host IDTV 101. Host IDTV 101 may also obtain auxiliary data and computer program from a network 207 other than digital broadcasting network, such as Internet, to integrate with the DTV contents 204 from the digital broadcasting network, and then use the integrated information.

DTV contents 204 include video and audio (AV) contents, host IDTV contents, and handheld IDTV contents. When a TV viewer uses a handheld device to select a DTV content, host IDTV 101 will keep the relevant host IDTV content in received DTV content 204 on host IDTV 101 for execution. The relevant handheld IDTV content will be transferred to the handheld device. During the process, the AV contents in DTV contents 204 may also be selectively transferred to the handheld device, and the AV contents may be trans-coded based on the context of the handheld device. The context includes the screen size, supported AV decoder, and so on. While the DTV content is in execution, the host IDTV contents and the handheld IDTV contents will use a certain protocol to synchronize the content state so that the execution states in both contents will be the same.

In the single-screen IDTV, the development of the IDTV contents usually relies on the authoring tool for IDTV contents to reduce the writing of the program code and simplify the IDTV content production. However, the single-screen IDTV has only one display screen, which allows only one TV viewer to operate the IDTV contents at a time. Although dual-screen can solve the above problem, the problems of context diversity and the lack of authoring tool remain the major obstacle for implementing dual-screen IDTV.

The handheld devices, such as PDA and smart phones, have different contexts, including screen sizes and input interfaces. Since it is almost impossible for programmers to maintain a version of computer program for each type of handheld device, a user interface technology that is adaptive and context-aware is required. Furthermore, the lack of standard for the dual-screen IDTV technology also results in the lack of readily available IDTV content authoring tools.

The modality-independent remote console technology may solve the problem of context diversity of handheld devices. The AIAP-URC (Alternate Interface Access Protocol-Universal Remote Console) standard of ANSI (American National Standards Institute) is a classic example of the modality-independent remote console technology. The AIAP-URC standard uses a language based on XML to describe an abstract user interface. The abstract description is mainly the information on the functions of the user interface, and optionally includes the presentation hint for the user interface. However, the detailed presentation information of the user interface is not included.

As the user interface of the TV remote control shown in FIG. 3, the abstract description of the user interface in the form of AIAP-URC standard includes the information on commands, variables, labels, and groups. The abstract user interface description includes three groups: numeric button group 311, volume control button group 313, and channel selection button group 315. Power button 317, numeric buttons (0-9), volume control buttons (+ and −), and channel selection buttons (+ and −) belong to the command information. Text message display 303 is the variable information. The capital "V" of the volume control button group and the capital "P" of the channel selection button group are the label information.

For different handheld devices, the abstract user interface description of the TV remote control in FIG. 3 can be translated into a physical/concrete user interface displayed on the handheld device according to the context, such as screen size, GUI function, and so on. Therefore, the TV remote controls displayed on different handheld devices may look different, while have the same functionality. In this manner, the context diversity problem can be overcome.

Europe Patent No. EP1659487 disclosed a method and apparatus for exchanging data between computer system and auxiliary displays. The system includes a main computer system and one or more auxiliary display devices. The application programs on the main computer system may use a unified API to treat different auxiliary display devices as user interfaces. The user interface can display the information for the user to read in order to remotely control the applications on the main computer system, or display the message notification issued by the applications. Each auxiliary display device has a dedicated display device driver on the main computer system. The display device driver will dynamically filter out the media contents that the auxiliary display device cannot display. With this method, the difference among the different auxiliary display devices will be hidden by the display device driver.

SUMMARY OF THE INVENTION

The present disclosure is directed to a dual-screen IDTV system. The dual-screen IDTV system and method may use the modality-independent remote console technology. In one exemplary embodiment, the dual-screen IDTV system may include a host IDTV and a handheld device.

In the exemplary dual-screen IDTV system, the host IDTV may include a host IDTV content, an IDTV middleware, a host Graphic User Interface (GUI), and a server-side remote console control protocol. The handheld device may include a handheld IDTV content, an interface generator, a handheld GUI, and a client-side remote console control protocol.

The server-side and the client-side remote console control protocols may use one or more network connecting technologies to communicate. The handheld IDTV contents may include two user interface (UI) abstract descriptions. One is the UI abstract description for a single-screen IDTV input device, and the other is the UI abstract description of the host IDTV content.

The input information from the UI of the host IDTV content may be transmitted through the client-side remote console control protocol, the server-side remote console control protocol, and the IDTV middleware to the host IDTV content. The output information for the UI of the host IDTV content may be transmitted through the IDTV middleware to one of the handheld GUI or host IDTV GUI.

In another exemplary embodiment, the present disclosure is directed to a method for operating in a dual-screen IDTV system having a host IDTV and a handheld device. Based on an IDTV content including at least one host IDTV content, the method may use a modality-independent remote console technology to generate a UI abstract description. The UI abstract description may include at least the UI abstract description of the host IDTV content, and the UI abstract description of the input device of the single-screen IDTV. The UI abstract description may be re-directed to the handheld device, and selectively used either in single-screen mode or in dual-screen mode for executing the DTV content.

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 4:
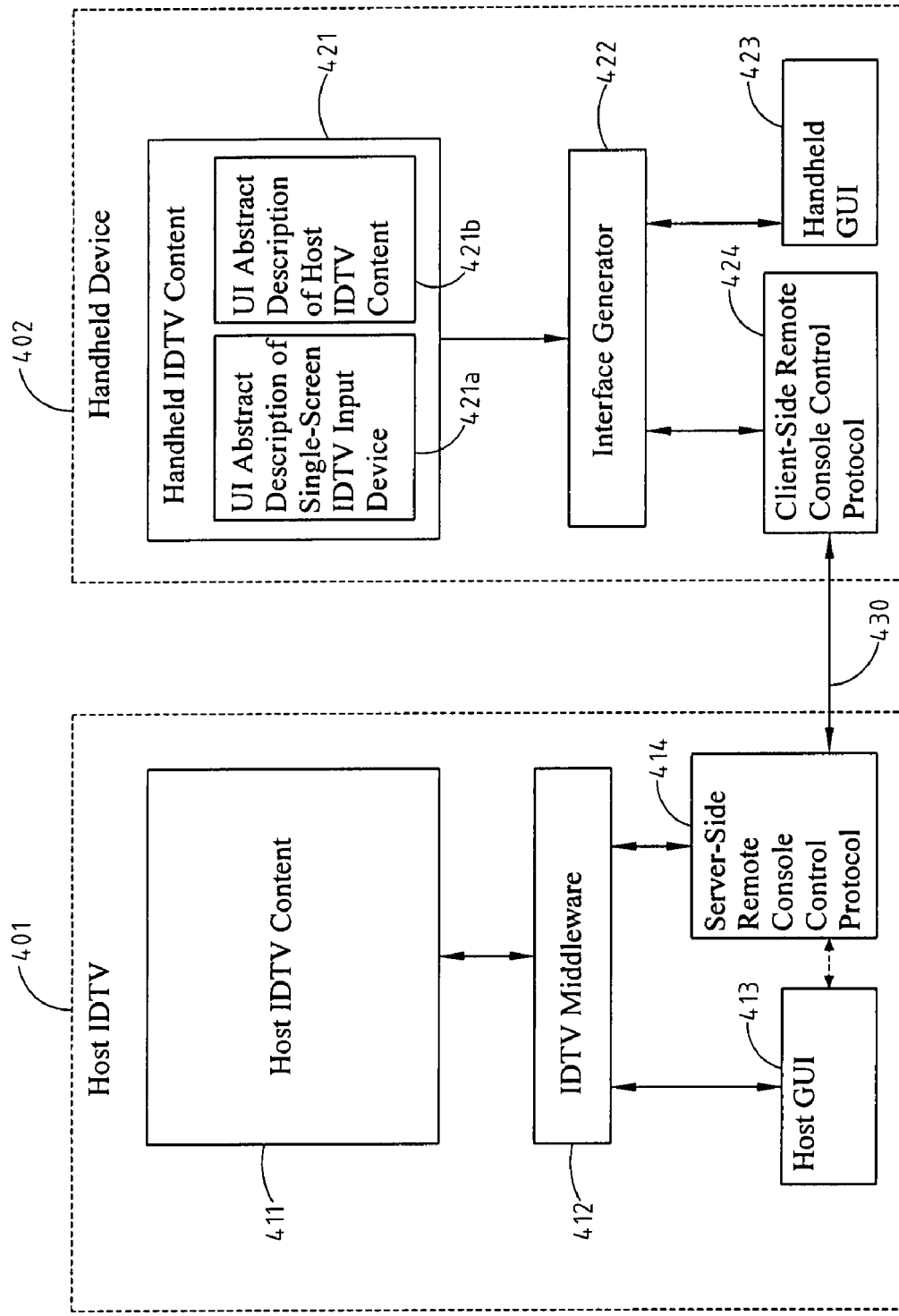
FIG. 4 shows a schematic view of an exemplary dual-screen IDTV system, consistent with certain disclosed embodiments.

FIG. 4 shows a schematic view of an exemplary dual-screen IDTV system, consistent with certain disclosed embodiments. The exemplary dual-screen IDTV system may be implemented with the modality-independent remote console technology. As shown in FIG. 4, a dual-screen IDTV system 400 may include a host IDTV 401 and a handheld device 402. Host IDTV 401 may include a host IDTV content 411, an IDTV middleware 412, a host Graphic User Interface (GUI) 413, and a server-side remote console control protocol 414.

Figure 1:
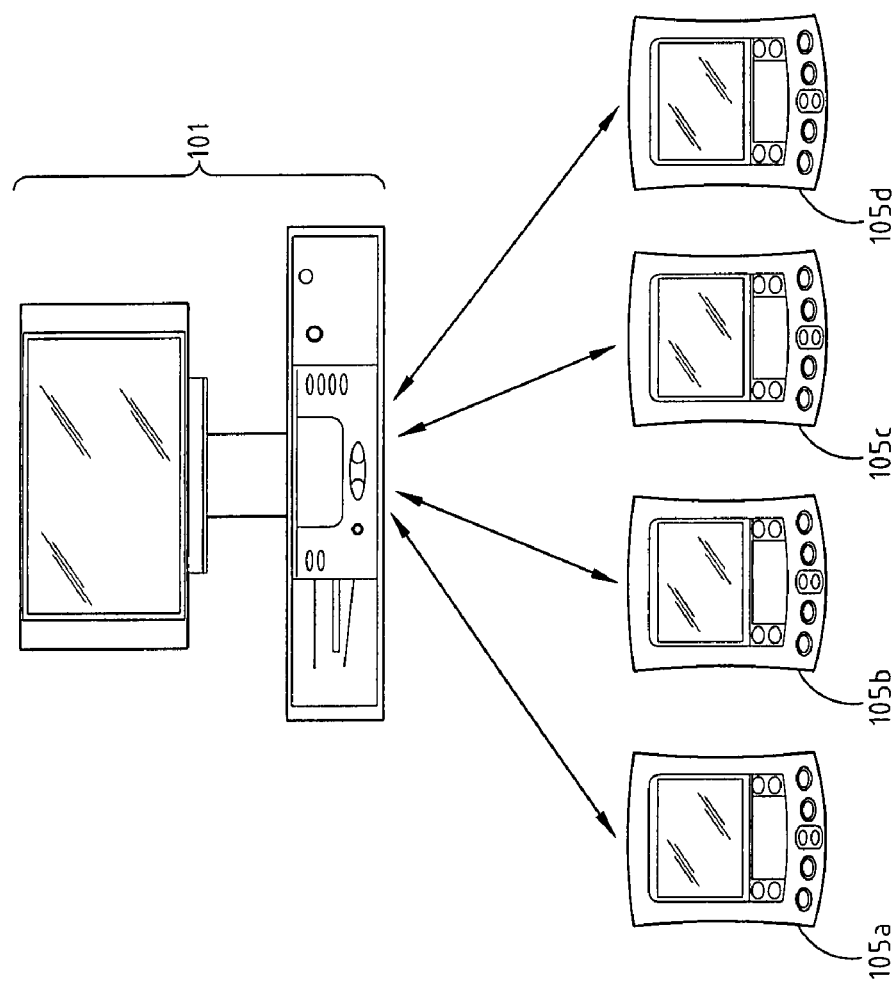
FIG. 1 shows a schematic view of an exemplary dual-screen IDTV.
Figure 2:
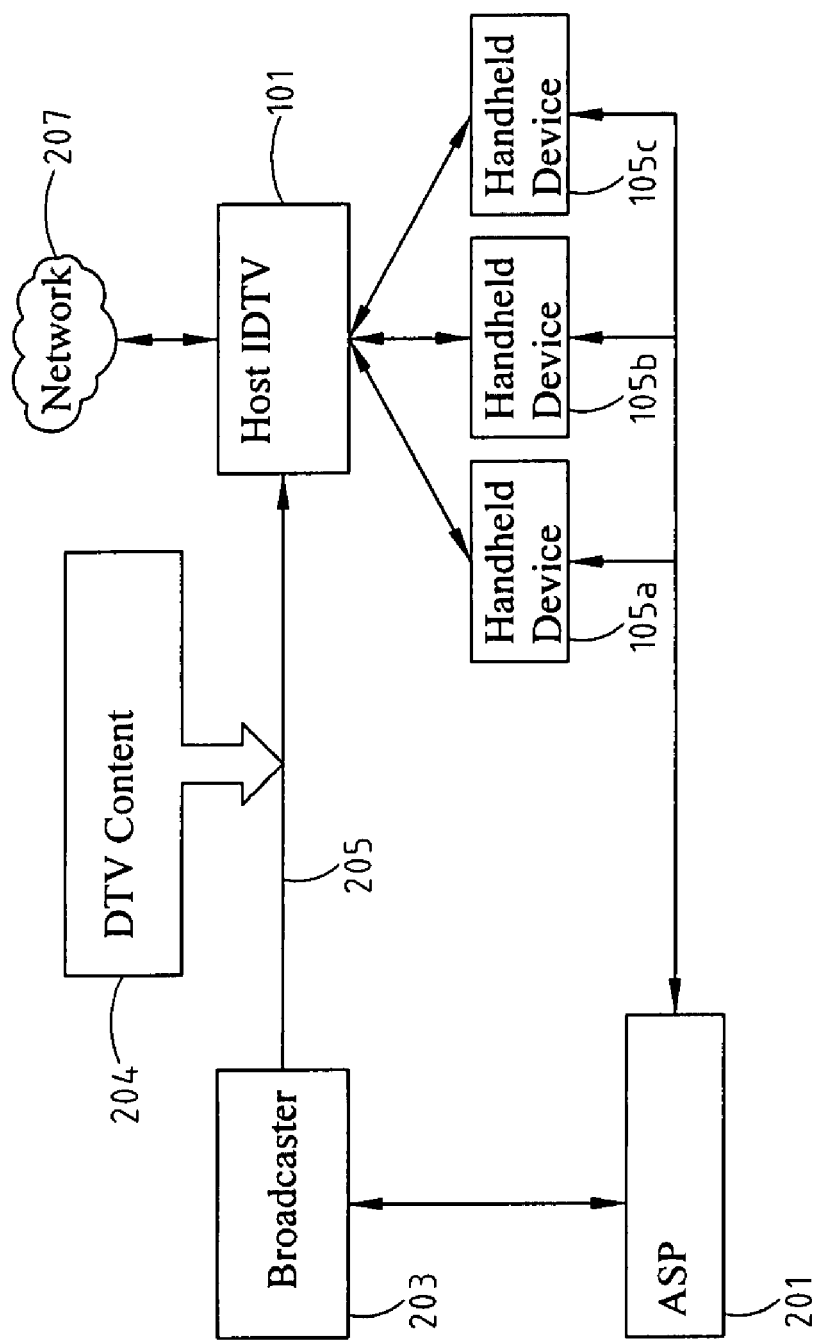
FIG. 2 shows a schematic view of the structure and the operation of an exemplary IDTV.
Figure 3:
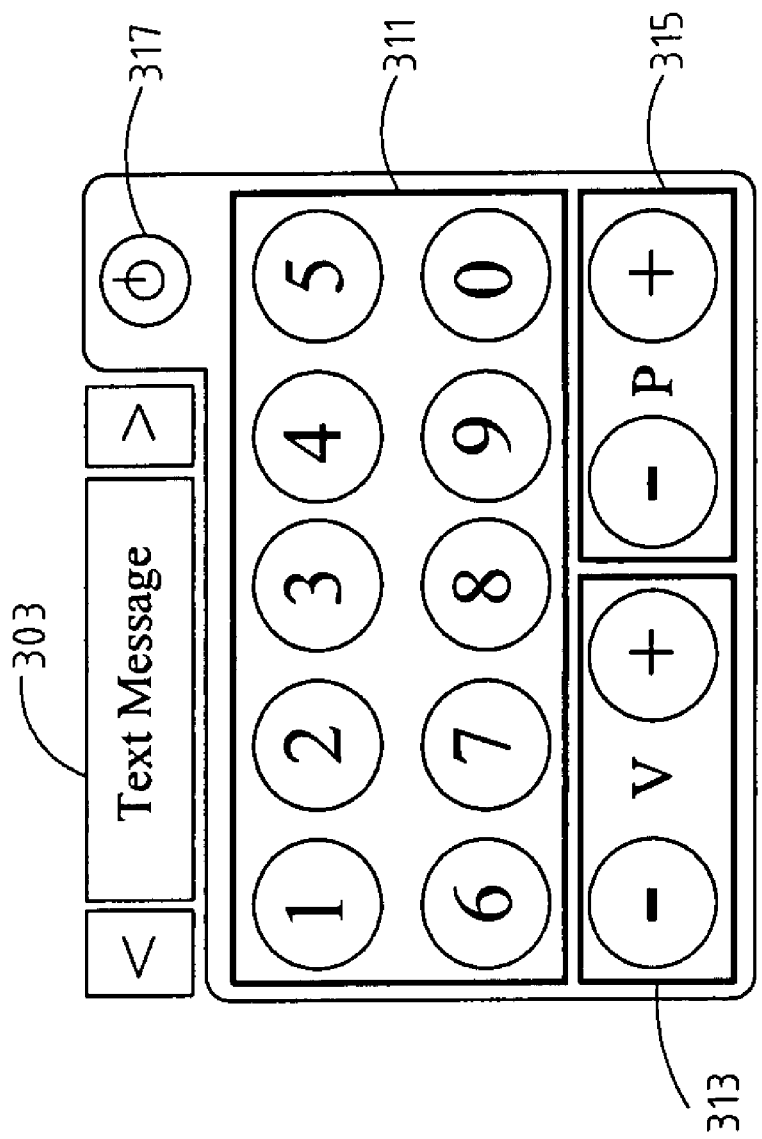
FIG. 3 shows a schematic view of an exemplary application using ANSI AIAP-URC 2005 standard.

Handheld device 402 may include a handheld IDTV content 421, an interface generator 422, a handheld GUI 423, and a client-side remote console control protocol 424. Handheld IDTV content 421 may include the abstract description of two GUIs. One may be the abstract description 421*a* of a single-screen IDTV input device, as the TV remote control in FIG. 3, and the other may be the abstract description 421*b* of the GUI of host IDTV content 411.

Remote console control protocols 414, 424 may use one or more multi-layer networking technology 430 to communicate. Each multi-layer networking technology may be seen as a combination of network technology and connection technology.

The UI input information of host IDTV content 411 may pass through client-side remote console control protocol 424 and multi-layer networking technology 430 to server-side remote console control protocol 414, and through IDTV middleware 412 to host IDTV content 411. The UI output information of host IDTV content 411 passes through IDTV middleware 412 to either handheld GUI 423 or host GUI 413. Hence, the output result may be displayed on the screen of either handheld device 402 or host IDTV 401.

In the multi-layer networking technology 430, the connection technology may be Bluetooth, 802.11 wireless network, Ethernet, WiMAX, and so on. The network technology may be a higher level protocol, and may provide the following four functions: discovery, object distribution, session management, and security. The discovery function may allow the client-side remote console control protocol 424 of handheld device 402 to find the list of available host IDTV/DTV contents that may provide remote console service in the current network environment. The object distribution function may transmit the handheld IDTV content from host IDTV to a handheld device. Through the session management, the client-side remote console control protocol may establish the connection with host IDTV, operate the remote console, and disconnect the established connection. The security function may allow the host IDTV and the handheld device user to authenticate with each other, and establish a secure session between the host IDTV and the handheld device.

The following describes the functions of each component of host IDTV 401.

Host IDTV content 411 is a part of DTV contents, and is the IDTV content that is executed on host IDTV 401. The format of host IDTV content 411 may be computer program, such as Java program or ANSI C/o-code program. The format may also be data, such as XML used by WTVML standard. The present disclosure may be applicable to the situations that the host IDTV content is computer program or data or any of their combinations.

IDTV middleware 412 is the system software for executing host IDTV content 411. For example, when host IDTV content 411 is a computer program, IDTV middleware 412 is called execution engine, and may provide API for host IDTV content 411 to call. When host IDTV content 411 is data, IDTV middleware 412 is called presentation engine, and is responsible for loading and interpreting host IDTV content 411.

Host GUI 413 is the GUI on host IDTV 401, and may be realized with a GUI system of OS, including related drivers, and a host GUI hardware. For example, when the host IDTV is a personal computer, the host GUI hardware may be computer monitor, keyboard, mouse, remote control, and so on. If host IDTV 401 is a set-top box or integrated digital TV (DTV), the host GUI hardware may be a TV screen and a remote control.

The components of host IDTV 401 may become remote console server through remote console control protocol 414 so that the handheld device can control the component remotely.

When host IDTV content 411 is a computer program, host IDTV content 411 will become remote console server through remote console control protocol 414. In other words, server-side remote console control protocol 414 is relayed through IDTV middleware 412 to host IDTV content 411. A possible realization is that IDTV middleware 412 provides an API to host IDTV content 411. When host IDTV content 411 is data, IDTV middleware 412 is the remote console server because host IDTV content 411 must be interpreted by IDTV middleware 412.

The following describes the functions of the components of handheld device 402.

Handheld IDTV content 421 is a part of DTV content. Handheld IDTV content 421 may include the abstract description information on two kinds of user interfaces. One is the UI abstract description 421a of a single-screen IDTV input device, such as TV remote control. UI abstract description information 421a is the UI abstract description information used in the single-screen mode of the DTV content. The other is the UI abstract description information 421b of the user interface of the host IDTV content. The UI abstract description 421b is used in the dual-screen mode of the DTV content.

For each DTV content, the user interface abstract description corresponding to the included host IDTV content 411 may be generated automatically by the authoring tool during the creation process of the DTV content.

Figure 5:
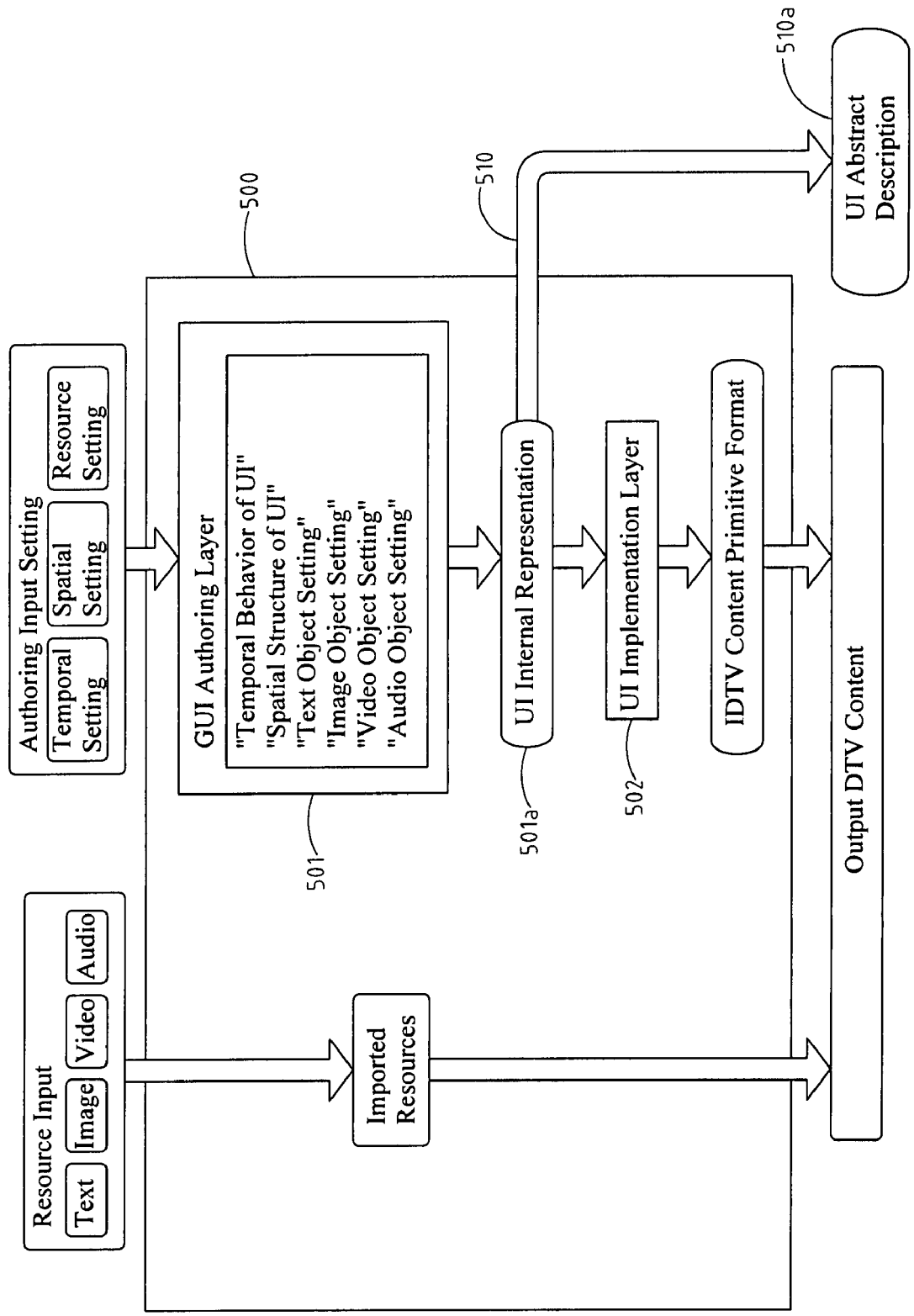
FIG. 5 shows an example on how to apply an authoring tool to automatically generate the UI abstract description required by modality-independent remote console technology, consistent with certain disclosed embodiments.

FIG. 5 shows an example on how to apply an authoring tool to automatically generate the UI abstract description required by modality-independent remote console technology, consistent with certain disclosed embodiments. Referring to FIG. 5, an authoring tool 500 for conventional single-screen IDTV content may include a GUI authoring layer 501 and a UI implementation layer 502. GUI authoring layer 501 is for the DTV content author to create the user interface for the IDTV content included in DTV content. The recorded information during authoring may include the temporal behavior of the user interface, spatial structure of the user interface, text object setting, image object setting, video object setting, audio object setting, and so on. After the DTV content author completes the creation of the IDTV content user interface, the GUI authoring layer will translate the above settings into a type of UI internal representation 501a. UI implementation layer 502 will translate UI internal representation 501a into a primitive format of IDTV content. For example, if the MHP standard is selected, the final format generated is Java program; if the WTVML standard is selected, the final format generated is XML file.

During the generation of UI internal representation 501a by GUI authoring layer 501, post processing 510 will remove the detailed presentation information of the UI and leave only UI functional description and UI presentation hint to obtain UI abstract description 510a.

Therefore, the dual-screen IDTV content author may apply the conventional single-screen IDTV content authoring tool to create the concrete user interface of host IDTV content 411, and the UI abstract description may be obtained via the authoring tool to remove the detailed presentation information. Thus, the UI abstract description for host IDTV content may be automatically generated during the DTV content creation process. Hence, the dual-screen IDTV content production may be integrated into the mature single-screen IDTV content production process.

After interface generator 422 receives handheld IDTV content 423, interface generator 422 may parse the two included UI abstract descriptions and construct the corresponding concrete UI description of the handheld device according to the DTV content execution mode and the handheld device context, such as handheld device hardware/software environment, user preference, and actual usage context. Then, handheld device GUI 423 may present the UI on the handheld device.

Handheld GUI 423 is the GUI on the handheld device, and may be implemented with an OS GUI module including related drivers, and a handheld GUI hardware. The handheld GUI hardware may be LCD panel, keyboard or other buttons, touch panel, and writing tablet.

Client-side remote console control protocol 424 is on the handheld device. This remote console control protocol may provide a remote console client API for interface generator 422 to call.

In the exemplary embodiment of FIG. 4, the present invention may apply the ANSI AIAP-URC standard as an instance of the modality-independent remote console technology, and use XML to describe the abstract UI.

In a dual-screen IDTV system, the DTV content may be executed in two different modes, including single-screen mode and dual-screen mode. The exemplary embodiments according to the present invention may be applicable to both modes, which will be described as follows.

The execution of the DTV content in the single-screen mode is the same as in the single-screen IDTV system. The video of the AV content included in the DTV content and the UI output of host IDTV content included in the DTV content may both be presented on the TV screen of the host IDTV. At this time, the handheld device is only used as the input device, similar to the TV remote control, to the host IDTV.

In the dual-screen mode, while the AV content included in DTV content is presented on the TV screen of the host IDTV, the UI output of host IDTV content is not presented on the TV screen of the host IDTV. Instead, the host IDTV content is presented on the handheld device in a remote console manner. As the handheld IDTV content includes the UI abstract description of the host IDTV content, the handheld device, by parsing the UI abstract description of the host IDTV content, may present the UI of the host IDTV content on the handheld device in the remote console manner according to the context of the handheld device.

In summary of the above description, in dual-screen mode, the UI of host IDTV content 411 may be presented on the screen of handheld device 402 through handheld GUI 423 by interface generator 422 of handheld device 402 according to the UI abstract description of the host IDTV content. In contrast, in single-screen mode, the UI of host IDTV content 411 may be presented on the screen of host IDTV 401 through host GUI 413 by IDTV middleware 412, while interface generator 422 of handheld device 402 may present the UI of the single-screen IDTV input device on the screen of handheld device 402 through handheld GUI 423 according to the abstract description of the single-screen IDTV input device.

The UI abstract description included in handheld IDTV content is mainly the UI functional information, and optionally includes UI presentation hint, such as UI component structure, group relationship, and ordering relationship. The UI abstract information does not include the detailed presentation information of the concrete UI, such as window placement and layout details of concrete UI, fonts used in the UI, and so on.

Therefore, when the modality-independent remote console technology is applied in the present invention, it is not necessary to consider the detailed presentation information of the concrete UI. Interface generator 422 of handheld device 402 may flexibly generate interfaces matching the contexts of different handheld devices. Hence, the exemplary embodiments according to the present invention may handle and solve the context diversity problem of different handheld devices, such as screen size.

The following describes exemplary operations of the present invention in single-screen and dual-screen modes.

In dual-screen mode, although the video part of the AV content of the DTV content will be presented on the TV screen of the host IDTV, the host IDTV content of the DTV content will not be presented on the TV screen of the host IDTV. Instead, the host IDTV content will be presented on the handheld device in the remote console manner. As the handheld IDTV content includes the UI abstract description of the host IDTV content, the handheld device parses and presents the UI abstract description of the host IDTV content in the remote console manner according to the handheld device context.

Figure 6:
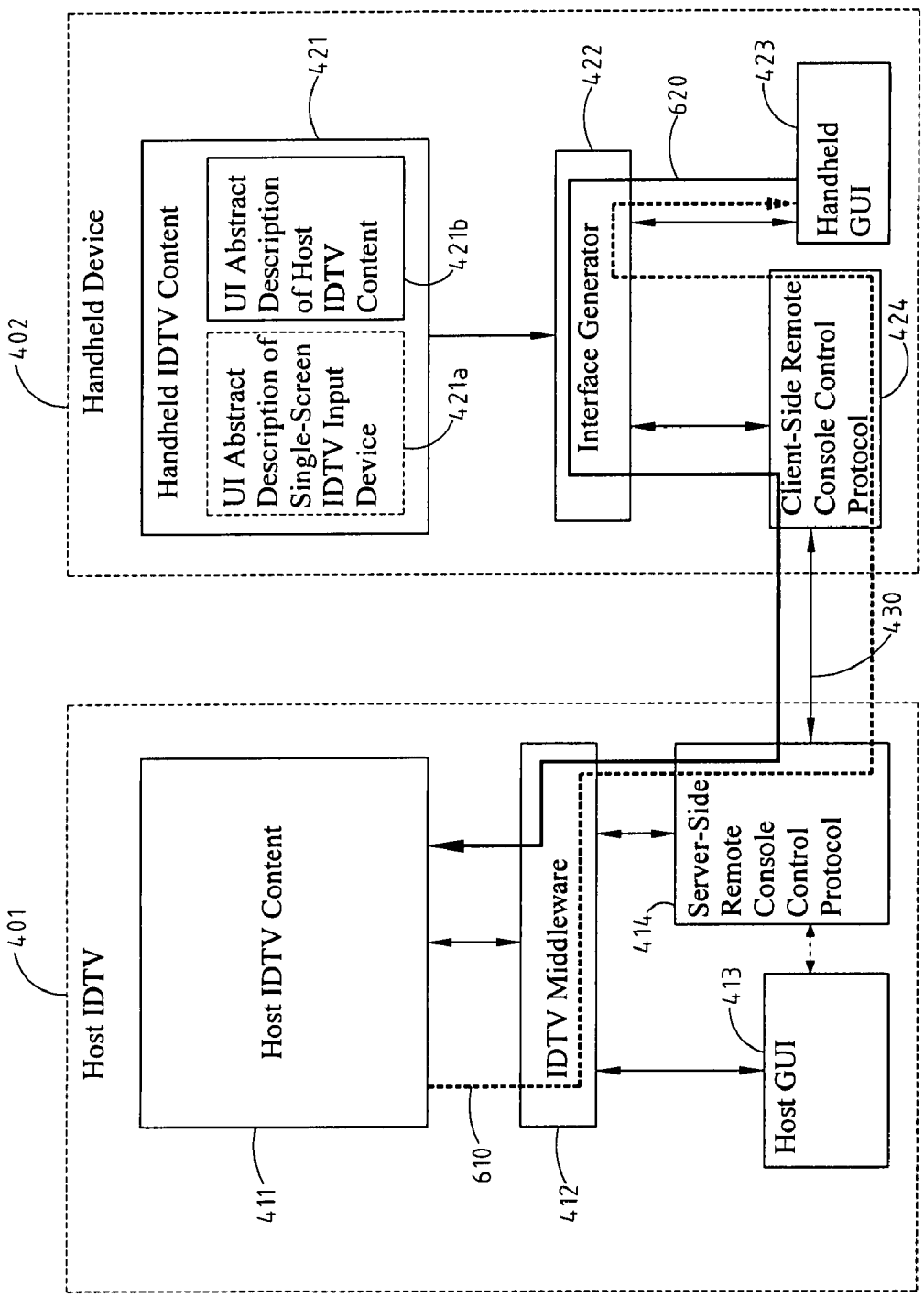
FIG. 6 shows an exemplary operation in the dual-screen mode, consistent with certain disclosed embodiments.

The UI output information of the host IDTV content may be transmitted through IDTV middleware, server-side remote console control protocol and multi-layer networking technology to the client-side remote console control protocol at the handheld device, and is received by an interface generator to translate into the concrete UI presentation information. The concrete UI presentation information is presented by handheld GUI on the handheld device. FIG. 6 shows an exemplary operation in dual-screen mode, consistent with certain disclosed embodiments.

Referring to FIG. 6, interface generator 422 of handheld device 402 receives handheld IDTV content 421, and then translates UI abstract description 421b of host IDTV content into the concrete UI description of handheld GUI 423 to be presented on the handheld device screen. However, the screen of host GUI 413 of host IDTV 401 will only present the video part of AV content, but not host IDTV content 411.

UI input information 620 of host IDTV content may be transmitted to host IDTV 401 through interface generator 422, client-side remote console control protocol 424, and multi-layer networking technology 430. With server-side remote console control protocol 414, host IDTV 401 transmits UI input information 620 of host IDTV content through IDTV middleware 412 to host IDTV content 411.

Similarly, when host IDTV 401 needs to transmit UI output information 610 of host IDTV content to handheld device 402, UI output information 601 of host IDTV content may pass through IDTV middleware 412, client-side remote console control protocol 414, and multi-layer networking technology 430 to handheld device 402.

In the single screen mode, the video part of AV content of DTV content and the UI output of host IDTV content of DTV content will be presented on the TV screen of host IDTV. In this case, the handheld device may be used as an input device, such as TV remote control, to the host IDTV.

Figure 7:
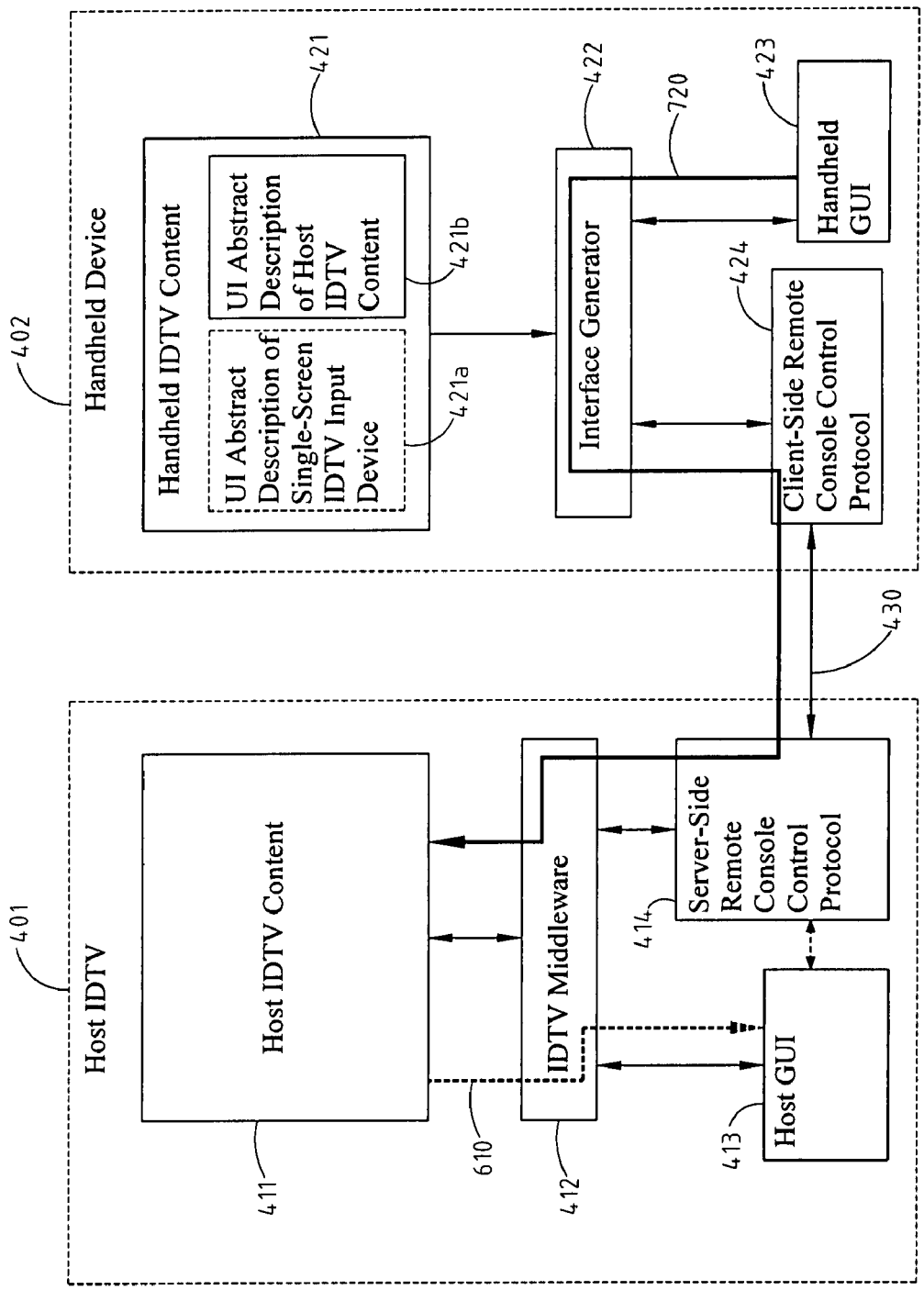
FIG. 7 shows an exemplary operation in the single-screen mode, consistent with certain disclosed embodiments.

In the single-screen mode, the UI output of the host IDTV content is presented on the host GUI. In other words, the UI output information of the host IDTV content is passed by the IDTV middleware to the host GUI to present on the TV screen. FIG. 7 shows an exemplary operation in the single-screen mode, consistent with certain disclosed embodiments.

Referring to FIG. 7, interface generator 422 of handheld device 402 receives handheld IDTV content 421, and translates UI abstract description of single-screen IDTV input device 421a into the concrete UI description of handheld GUI 423 to be presented on the handheld device screen.

Unlike in the dual-screen mode, UI output information 610 of the host IDTV content in single-screen mode is presented by host GUI 413 of host IDTV 401 on the screen of host IDTV 401. UI input information 720 of host IDTV content is transmitted through the concrete UI (presented on handheld GUI 423) to host IDTV 401. The concrete UI is generated by interface generator 422 of handheld device 402 according to UI abstract description 421a of single-screen IDTV input device for host IDTV 401.

The concrete UI on handheld GUI 423, produced by interface generator 422 according to the UI abstract description 421a of single-screen IDTV input device, may be an input device of IDTV middleware 405 or an input device of host GUI 413. Therefore, unlike the dual-screen mode, the remote console server in the single-screen mode may be IDTV middleware 412 or a driver of an input device of host GUI 413. The screen of host GUI 413 of host IDTV 401 may simultaneously present the video of AV content and host IDTV content 411.

In the summary of the above description, the exemplary system according to the present invention may be applicable to both single-screen and dual-screen execution modes of DTV contents. According to the present invention, the DTV content may support only dual-screen mode, or may switch between dual-screen and single-screen modes. Furthermore, the present invention may be applicable when the host IDTV content is either computer program or data.

Figure 8:
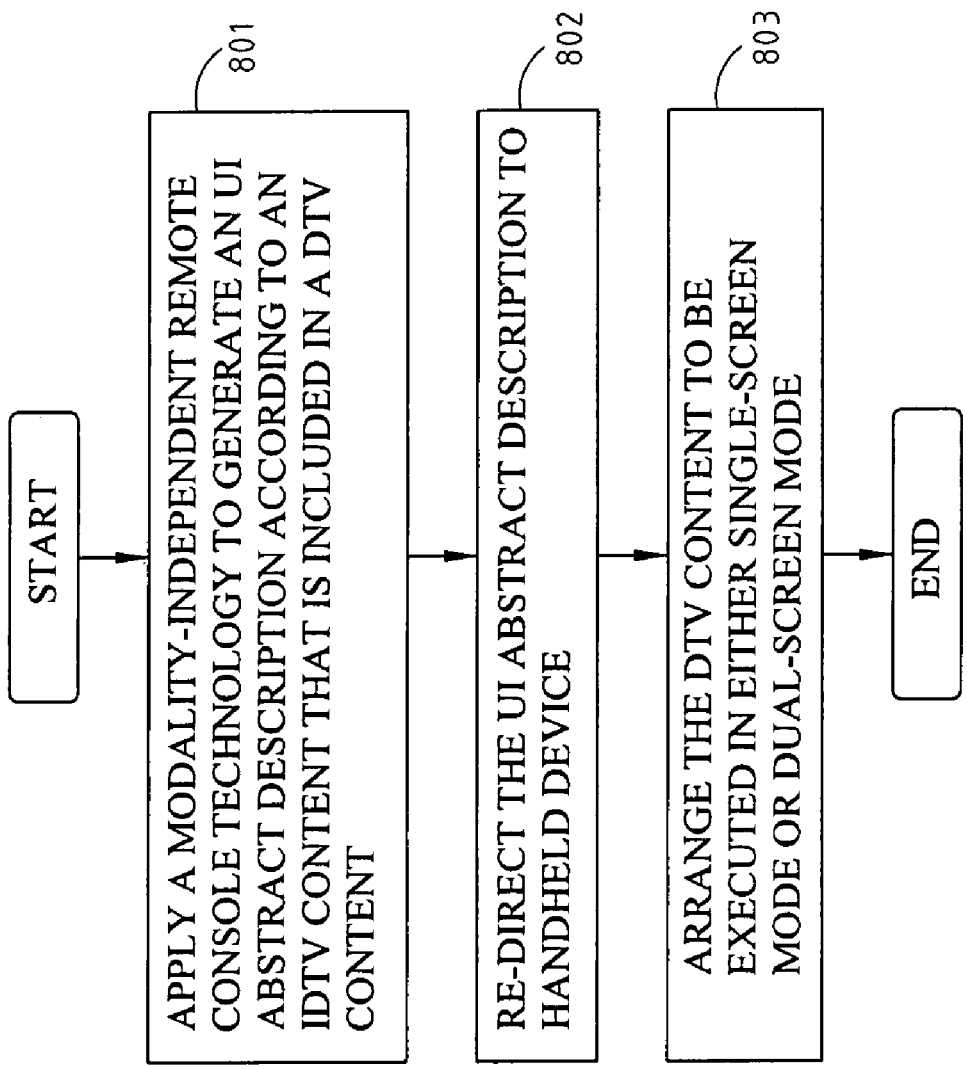
FIG. 8 shows an exemplary flowchart illustrating a method of dual-screen IDTV, consistent with certain disclosed embodiments.

FIG. 8 shows an exemplary flowchart illustrating a method of dual-screen IDTV, consistent with certain disclosed embodiments. Referring to the exemplary flowchart, a modality-independent remote console technology is applied to generate a UI abstract description according to an IDTV content included in a DTV content, as shown in step 801. In step 801, the IDTV content may include host IDTV content 411 and handheld IDTV content 421. The UI abstract description may include UI abstract description 421a of a single-screen IDTV input device and UI abstract description 421b of host IDTV content.

The UI abstract description may be stored in handheld IDTV content 421 of the DTV content. There may be two ways to generate the abstract description of the single-screen IDTV input device. For example, the first way is that the broadcaster generates it before broadcasting the DTV content, and attaches it to the handheld IDTV content 421 included in the DTV content. The second way is that host IDTV 401 generates it and attaches it to the handheld IDTV content 421 of the DTV content while the handheld IDTV content is transmitted from host IDTV 401 to handheld device 402. UI abstract description 421b of the host IDTV content may be automatically generated by the authoring tool used in the creation of DTV content.

Step 802 is to re-direct the UI abstract description to handheld device 402. The UI abstract description, including the UI abstract description of the host IDTV content and the UI abstract description of the single-screen IDTV input device, are stored in the same handheld IDTV content 421 of DTV content.

In step 803, the DTV content to be executed may be arranged in either single-screen mode or dual-screen mode.

Figure 9:
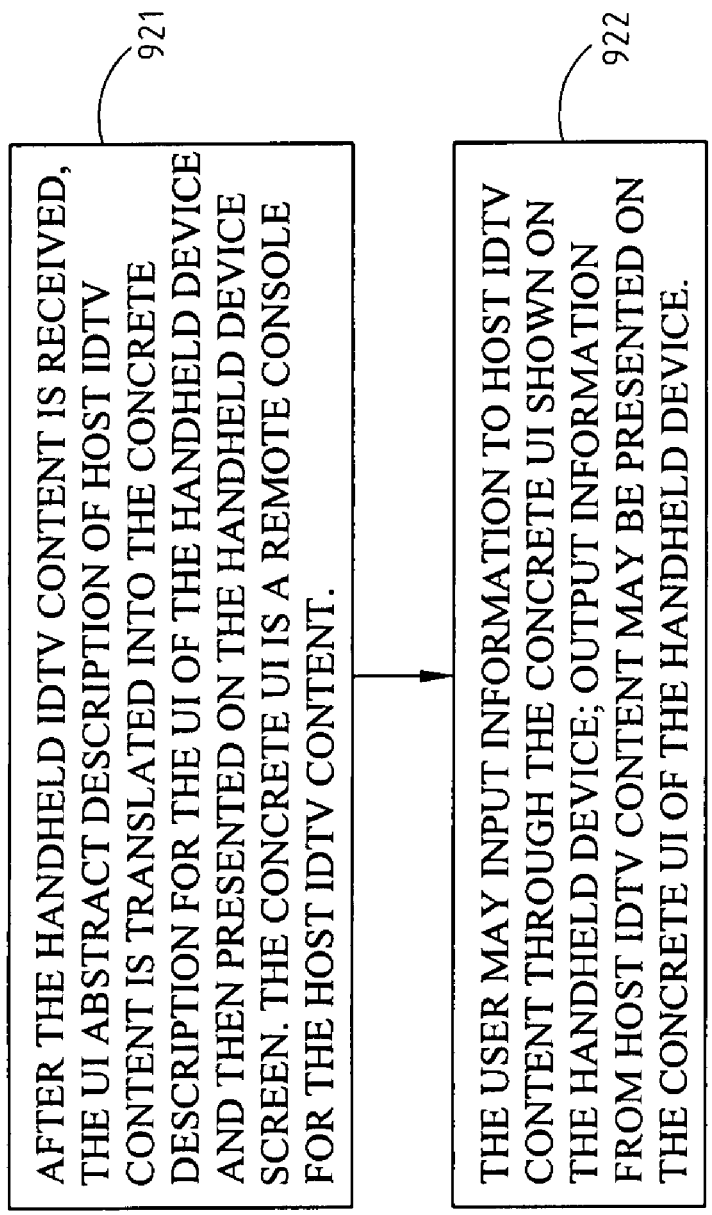
FIG. 9 shows an exemplary operation of the DTV content in the dual-screen mode, consistent with certain disclosed embodiments.
Figure 10:
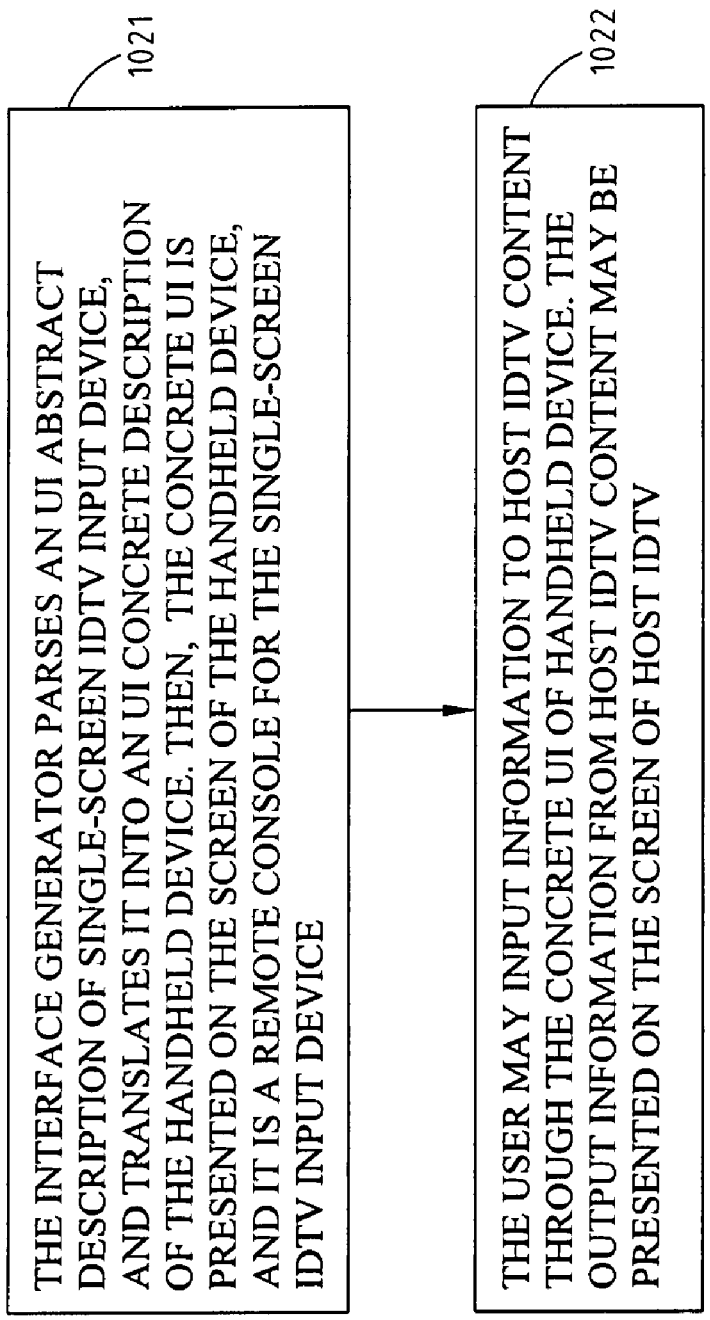
FIG. 10 shows an exemplary operation of the DTV content in the single-screen mode, consistent with certain disclosed embodiments.

FIGS. 9 & 10 respectively show the exemplary operation of the DTV content execution in single-screen mode and dual-screen mode, consistent with certain disclosed embodiments.

As shown in FIG. 9, in dual-screen mode, after the handheld IDTV content is received, the UI abstract description of host IDTV content is translated into the concrete description of the handheld device and presented on the handheld device screen, as shown in step 921. The concrete UI is the remote console of the host IDTV content.

With client-side remote console control protocol 424 and multi-layer networking technology 430, in step 922, the user may input information 620 through the concrete UI of handheld device 402 to host IDTV content 411. Output information 610 from host IDTV content 411 may be presented on the concrete UI of handheld device 402.

As aforementioned, in step 921, interface generator 422 may translate, according to the handheld hardware/software environment, user preference, and usage context, the UI abstract description of the host IDTV content into the UI concrete description of the handheld device, and present it on handheld GUI 423. The concrete UI on the handheld device is a remote console for host IDTV content 411.

In step 922, the user may input information 620 through the concrete UI of handheld device 402 to host IDTV content 411. Input information 620 may be transmitted to host IDTV content 411 through client-side remote console control protocol 424 and multi-layer networking technology 430.

Similarly, output information 610 from host IDTV content 411 of host IDTV 401 may be presented on the concrete UI of handheld device 402.

As aforementioned, output information 610 of the host IDTV content on host IDTV 401 may be transmitted through IDTV middleware 412, server-side remote console control protocol 414 and multi-layer networking technology 430 to handheld device 402. Interface generator 422, after receiving output information 610, will present the output information on handheld GUI 423.

In single-screen mode, as shown in FIG. 10, the interface generator parses UI abstract description of single-screen IDTV input device, and translates it into UI concrete description of the handheld device. The concrete UI is a remote console for the single-screen IDTV input device, as shown in step 1021.

As aforementioned, the execution result of host IDTV content will be presented on the host IDTV screen. The remote console generated in step 1021 is only an input interface of the host IDTV.

In step 1022, the user may input information through the concrete UI of handheld device 402 to host IDTV content 411. The output information from host IDTV content 411 may be presented on the screen of host IDTV 401.

Output information 610 of the host IDTV content of host IDTV 401 may be transmitted through IDTV middleware 412 to be presented on the screen of host IDTV 401 by host GUI 413.

The user may input information 720 through the remote console on the handheld device, client-side remote console control protocol 424 and multi-layer networking technology 430 to host IDTV content 411.

The remote console on the handheld device transmits the input information from the user through client-side remote console control protocol and multi-layer networking technology to one of the two components of the host IDTV, that is, either IDTV middleware 412 or host GUI 413. This may depend on the implementation details of the host IDTV input device.

In the first scenario, the remote console of the single-screen IDTV input device may be treated as an input device to the IDTV middleware. The input information is transmitted by the server-side and the client-side remote console control protocols to the IDTV middleware. In this scenario, a driver module is implemented in the IDTV middleware for driving the remote console of the single-screen IDTV input device.

In the second scenario, the remote console of the single-screen IDTV input device may be treated as an input device to the host GUI. The input information is transmitted by the server-side and the client-side remote console control protocols to the host GUI. The host GUI then relays the input information to the IDTV middleware. In this scenario, a driver module is implemented in the host GUI for driving the remote console of the single-screen IDTV input device.

The following working examples may describe the system and method consistent with certain disclosed embodiments, when host IDTV content is computer program and data, respectively.

Figure 11:
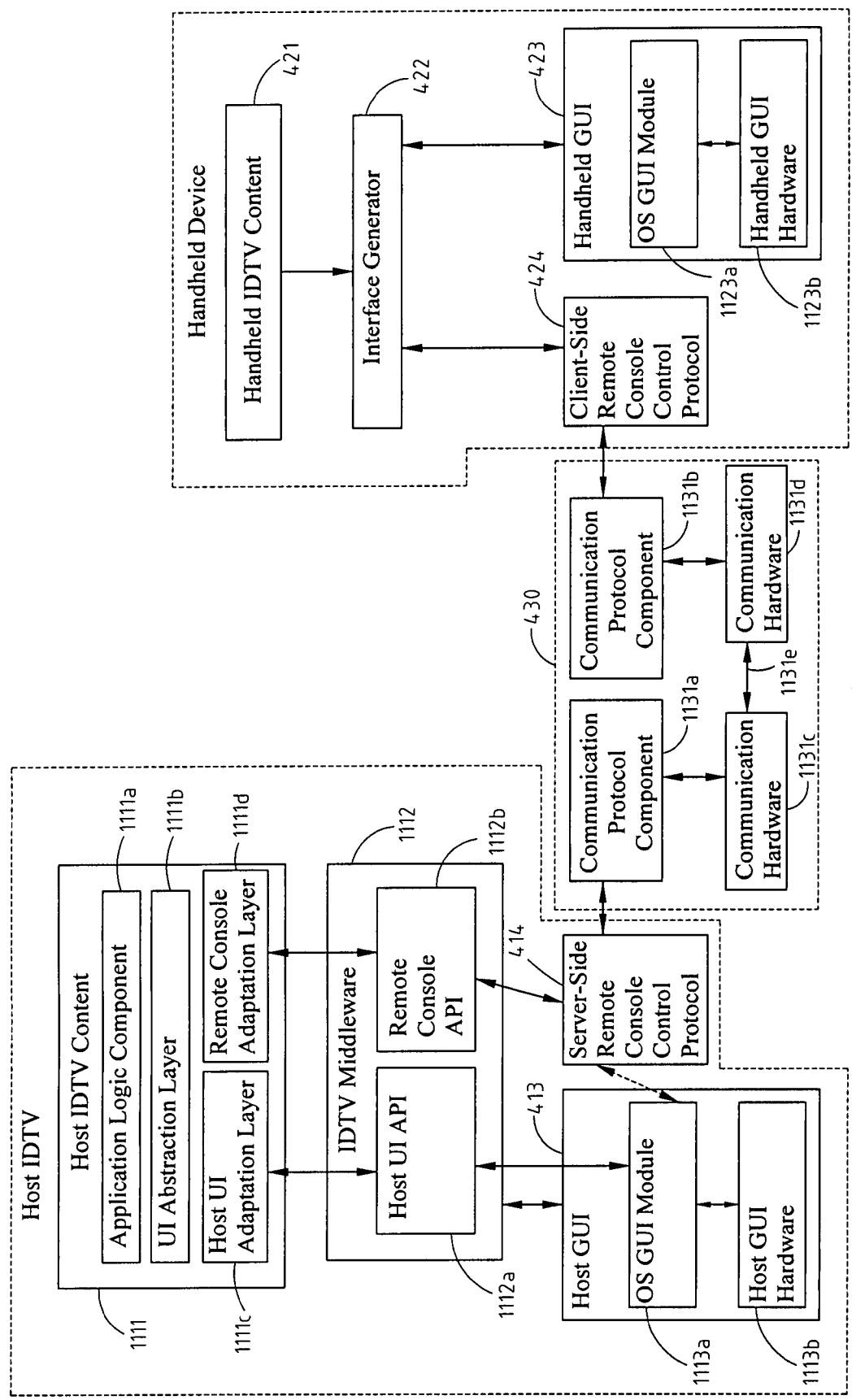
FIG. 11 shows a first working example illustrating a system and method of dual-screen IDTV when the host IDTV content is a computer program, consistent with certain disclosed embodiments.

FIG. 11 shows a first working example illustrating a system and method of dual-screen IDTV when the host IDTV content is a computer program, consistent with certain disclosed embodiments. In this working example, the IDTV middleware may be called an execution engine, and provides an API to the host IDTV content. Referring to FIG. 11, the following describes the component and the corresponding function of the host IDTV.

In this working example, host IDTV content 1111 may include an application logic component 1111a, a UI function abstraction layer 1111b, a host UI adaptation layer 111c, and a remote console adaptation layer 111d.

UI function abstraction layer 1111b may provide the API for the UI input and output. The API is generated automatically by the authoring tool for DTV content. For each UI group of the host IDTV content, the authoring tool generates a corresponding API set. Application logic component 1111a may be a part of the computer program of host IDTV content 1111 that is irrelevant to the UI. Application logic component 1111a may receive input information from UI or send output information to UI through each UI group by calling the API provided by the UI function abstraction layer.

When DTV content is executed in single-screen and dual-screen modes, respectively, UI function abstraction layer 1111b may connect and communicate with IDTV middleware 1112 through host UI adaptation layer 1111c and remote console adaptation layer 1111d, respectively.

In the first working example, IDTV middleware 1112 may include two API sets: a host UI API 1112a, and a remote console API 1112b. In single-screen mode, UI function abstraction layer 1111b calls host UI API 1112a through host UI adaptation layer 1111c. Similarly, in dual-screen mode, UI function abstraction layer 1111b calls remote console API 1112b through remote console adaptation layer 1111d.

Host UI API 1112a may be an API set related to host UI functions, and be provided by IDTV middleware 1112 for the host UI adaptation layer 1111c of the host IDTV content 1111 to call. When host IDTV content 1111 is in the single-screen mode, host IDTV content 1111 calls host UI API 1112a to present the UI of host IDTV content 1111 through host GUI 413. In addition, the remote console of the single-screen IDTV input device may also be used as an input device of the host IDTV content by calling host UI API 1112a.

When host IDTV content 1111 is in dual-screen mode, IDTV middleware 1112 provides remote console API 1112b for remote console adaptation layer 1111d to call for accessing the functions provided by server-side remote console control protocol 414.

IDTV middleware 1112 is also responsible for controlling host IDTV content 1111 to execute in either single-screen or dual-screen mode. While switching execution mode, IDTV middleware 1112 is responsible for notifying host IDTV content 1111.

Host GUI 413 may include an OS GUI module 1113a and a host GUI hardware 1113b. OS GUI module 1113a includes the software module and related drivers provided in the OS for supporting GUI operations. Host GUI hardware 1113b is the actual hardware used in the GUI.

For example, if host IDTV 401 is a PC, host GUI hardware 1113b may be PC monitor, keyboard, mouse, remote control, and so on. If host IDTV 401 is a set-top box or an integrated DTV, host GUI hardware 1113b may be TV monitor and remote control. When the DTV content is in single-screen mode, the remote console of the single-screen IDTV input device generated by interface generator 422 on handheld device 402 is one of the input devices managed by OS GUI module 1113a. In this case, OS GUI module 1113a may interact with handheld device 402 through server-side remote console control protocol 414.

Similarly, handheld GUI 423 on handheld device 402 may also include an OS GUI module 1123a and a handheld GUI hardware 1123b. OS GUI module 1123a is the software module and related drivers provided in the OS for supporting GUI operation. Handheld GUI hardware 1123b is the actual hardware used in the GUI, such as LCD panel, keyboard or other button sets, touch panel, writing tablet, and so on.

Multi-layer networking technology 430 between the host IDTV and the handheld device may be implemented with two communication protocol components 1131a, 1131b, two communication hardware 1131c, 1131d, and a physical communication network 1131e.

The functions of the communication protocol components may include all the functions of the network technology, and the part of functions realized by software in connection technology. The communication protocol components are usually provided by OS, and drivers related to network communication. However, in some cases, the implementation of actual server-side and client-side remote console control protocols may use some networking middleware that is not provided by the OS. Communication hardware and physical communication network provide the part of functions realized by hardware in connection technology.

In the working example of FIG. 11, UI abstraction layer 1111b, host UI adaptation layer 1111c, and remote console adaptation layer 111d of host IDTV content 1111 are all automatically generated by IDTV authoring tool during the production of host IDTV content 1111, and will not be shared by other host IDTV contents.

When the host IDTV content is data, the host IDTV content usually includes the data described in the form of some markup languages and the script language that may operate the data. The data and the script of the host IDTV content may both be generated by IDTV authoring tool. There may be two types of the data described by markup language in the host IDTV content. For example, one is irrelevant to UI presentation, and the other is related to UI presentation.

Figure 12:
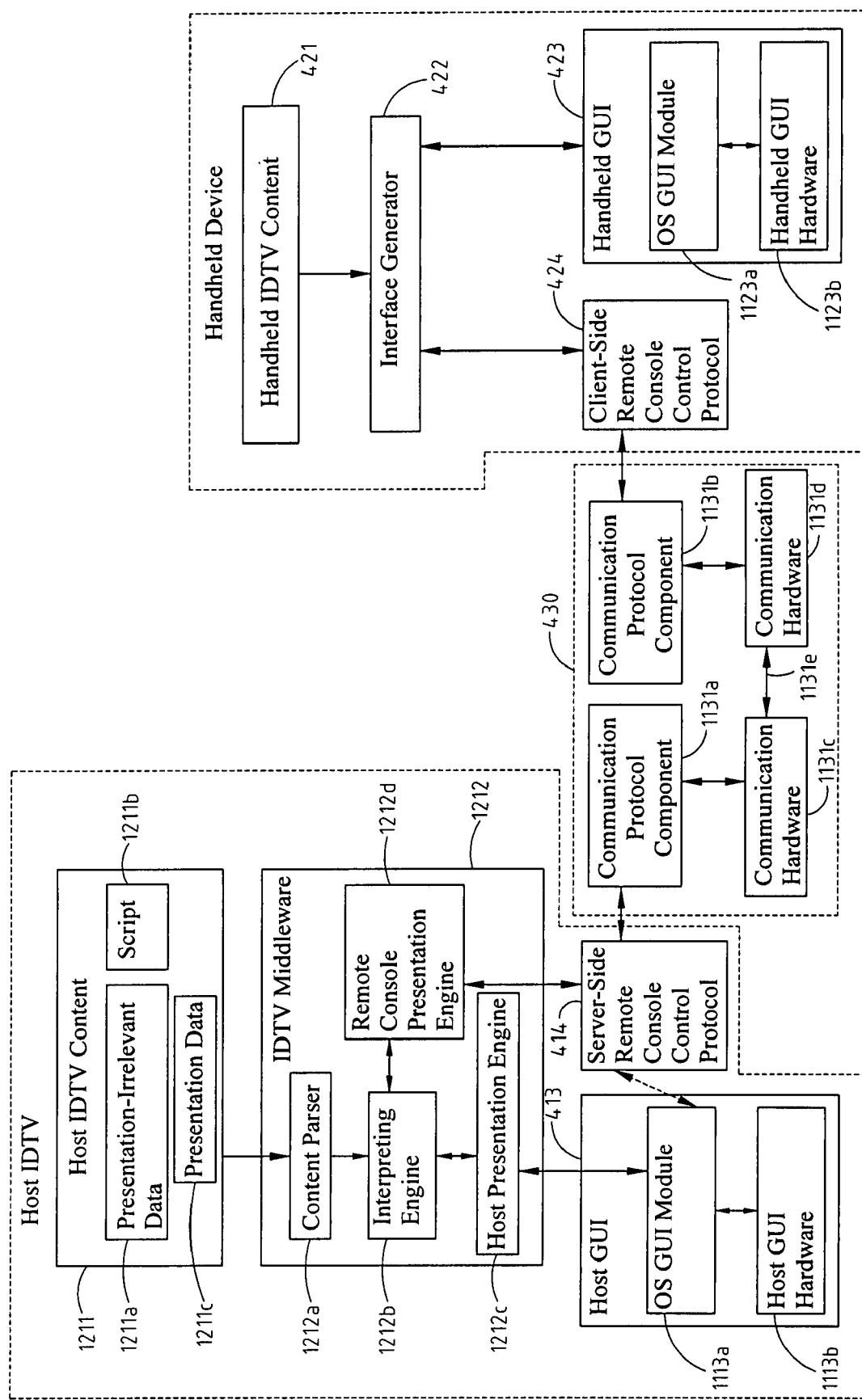
FIG. 12 shows a second working example illustrating a system and method of dual-screen IDTV when the host IDTV content is data, consistent with certain disclosed embodiments.

FIG. 12 shows a schematic view of a second working example illustrating a system and method of dual-screen IDTV when the host IDTV content is data, consistent with certain disclosed embodiments. The data described by markup language, such as ETSI WTVML, may include presentation-irrelevant part and presentation-related part so that those two parts can be separated. For example, the host IDTV content that conforms to ETSI WTVML standard has a data model and a presentation model that may be separated. In addition, the DVB-HTML standard of digital video broadcast (DVB) and the Broadcast Markup Language (BML) standard of Association of Radio Industries and Business (ARIB) both support the cascading style sheets (CSS); therefore, the data described by these types of standard languages will have presentation-irrelevant and presentation-related parts that can be separated.

Referring to FIG. 12, in the second working example, host IDTV content 1211 may include presentation-irrelevant data 1211a and script 1211b. In addition, host IDTV content 1211 may further include a presentation data 1211c. Presentation data 1211c may describe how to present the combination of the presentation-irrelevant data and script on both the host GUI and the remote console on the handheld device. More specifically, presentation data 1211c may provide the detail presentation information for the UI components described by the presentation-irrelevant data 1211a and script 1211b. In addition, presentation data 1211c may describe the relationship between the UI components supported by both the presentation-irrelevant data 1211a and the script 1211b, and the corresponding UI component in the UI abstract description of host IDTV content.

In the second working example, IDTV middleware 1212 may be called presentation engine, and may be realized with a content parser 1212a, an interpreting engine 1212b, a host presentation engine 1212c, and a remote console presentation engine 1212d.

Content parser 1212a is responsible for loading host IDTV content 1211, translating it into the internal representation required by the operation of IDTV middleware 1212, and delivering the internal representation to interpreting engine 1212b. The host IDTV content 1211 in the form of data is usually page-based data, and may be divided into a plurality of independent pages for processing. Therefore, interpreting engine 1212b of IDTV middleware 1212 may interpret and maintain the presentation-irrelevant data on one page at a time. In addition, interpreting engine 1212b may also execute the script at appropriate time.

In the second working example, when DTV content is in single-screen mode, IDTV middleware 1212 may apply host presentation engine 1212c to present the interpreted data page on the host IDTV screen according to the presentation data of the host GUI in host IDTV content 1211.

When DTV content is in dual-screen mode, IDTV middleware 1212 may apply remote console presentation engine 1212d to present the interpreted data page in the remote console form on the screen of handheld device 402 according to the remote console presentation data of host IDTV content 1211.

An exemplary operation of remote console presentation engine 1212d may apply the remote console presentation data to translate the UI event from server-side remote console control protocol 414 and relay them to interpreting engine 1212b; in the mean time, the UI event from interpreting engine 1212b is also translated and relayed to interpreting engine 1212b.

Figure 13:
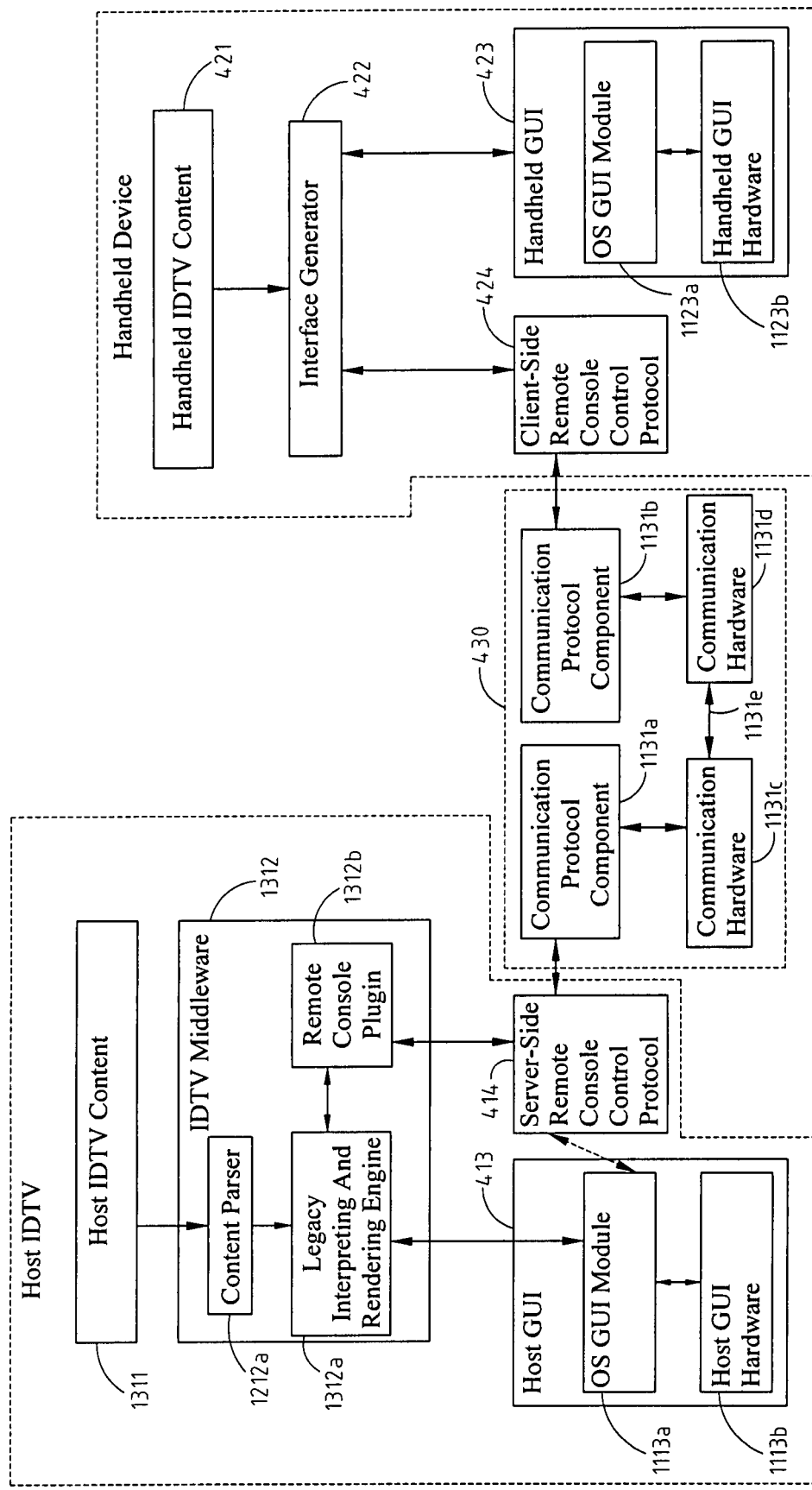
FIG. 13 shows a third working example illustrating a system and method of dual-screen IDTV when the host IDTV content is data, consistent with certain disclosed embodiments.

FIG. 13 shows a third working example illustrating a system and method of dual-screen IDTV when the host IDTV content is data, consistent with certain disclosed embodiments. In the working example, the markup language data whose presentation-irrelevant part and presentation-related part are mixed, for example, the HTML web page without the use of CSS. In this case, the presentation-irrelevant data and the presentation data used by host GUI may be mixed in HTML web page.

Referring to the third working example shown in FIG. 13, IDTV middleware 1312 may be realized with a content parser 1212a, a legacy interpreting and rendering engine 1312a and a remote console plugin 1312b.

Legacy interpreting and rendering engine 1312a is responsible for interpreting the markup language data in host IDTV content 1311, including host GUI presentation data and presentation-irrelevant data, and executing the script in host IDTV content 1311. In single-screen mode, legacy interpreting and rendering engine 1312a is also responsible for presenting host IDTV content 1311 on the display of host IDTV 401.

Remote console plugin 1312b, in single-screen mode, does not affect the behavior of legacy interpreting and rendering engine 1312a. In dual-screen mode, remote console plugin 1312b executes two tasks. One task is to turn off the presentation function of legacy interpreting and rendering engine 1312a on host IDTV 401. The other task is to present host IDTV content 1311 in the remote console manner on the screen of handheld device 402.

Remote console plugin 1312b may be similar to remote console presentation engine 1212d of FIG. 12. Remote console plugin 1312b may apply the remote console presentation data to translate the UI event from server-side remote console control protocol 414, and trigger the corresponding event in legacy interpreting and rendering engine 1312a. In the mean time, remote console plugin 1312b translates the UI event intercepted from legacy interpreting and rendering engine 1312a, and transmits the translated event to server-side remote console control protocol 414.

In the working examples of FIGS. 12 and 13, the IDTV middleware is responsible for parsing the static data of the host IDTV content, and responsible for parsing and interpreting of the dynamic data, such as script. Handheld device 402 is only responsible for presenting the information designated by the remote console presentation engine or remote console plugin.

In summary of the above description, the DTV content of the present invention may only be executed in dual-screen mode, or may be switched between single-screen and dual-screen modes. The present invention may be applicable to both aforementioned DTV content execution cases no matter whether the host IDTV content is computer program or data.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dual-screen interactive digital television (IDTV) system, realized with a single-screen mode and a dual-screen mode by applying a modality-independent remote console technology, said system comprising:

a host IDTV, including a host IDTV content, an IDTV middleware in communication with and managing said host IDTV content, a host graphic user interface (GUI) in communication with said IDTV middleware, and a server-side remote console control protocol in communication with said IDTV middleware and said host GUI, said host IDTV content at least including a computer program or a combination of a computer program and data; and a handheld device, including a handheld IDTV content comprising two user interface (UI) abstract descriptions that contain UI functional information without detailed presentation information of a concrete UI, an interface generator parsing said UI abstract descriptions and constructing a handheld concrete UI, a handheld GUI in communication with said interface generator, and a client-side remote console control protocol in communication with said interface generator, said two UI abstract descriptions including a UI abstract description of a single-screen IDTV input device realized in said single-screen mode, and a UI abstract description of said host IDTV content realized in said dual-screen mode;

wherein said server-side remote console control protocol and said client-side remote console control protocol are connected by a multi-layer networking technology, UI input information to said host IDTV content is relayed through said client-side remote console control protocol and said multi-layer networking technology to said server-side remote control protocol, and transmitted by said IDTV middleware to said host IDTV content, UI output information from said host IDTV content is transmitted through said IDTV middleware to either said handheld GUI or said host GUI, and in said dual-screen mode, an AV content is presented on said host GUI but not on said handheld GUI and said UI output information from said host IDTV content is presented on said handheld GUI but not on said host GUI, said server-side remote control protocol enables said host IDTV content to become a remote console server with said handheld concrete UI of said handheld device being a remote console when said host IDTV content is a computer program or a combination of a computer program and data, and said server-side remote control protocol enables said IDTV middleware to become a remote console server when said host IDTV content is data.

2. The system as claimed in claim 1, wherein said multi-layer networking technology is the combination of a network technology and a connection technology.

3. The system as claimed in claim 1, wherein said system automatically generates said UI abstract descriptions required by said modality-independent remote console technology.

4. The system as claimed in claim 1, wherein said multi-layer networking technology is realized with two communication protocol components, two pieces of communication hardware, and a physical communication network.

5. The system as claimed in claim 1, wherein said host GUI is realized with an OS GUI module and a host GUI hardware.

6. The system as claimed in claim 1, wherein said handheld GUI is realized with an OS GUI module and a handheld GUI hardware.

7. The system as claimed in claim 1, wherein said system is switchable between said single-screen mode and said dual-screen mode.

8. The system as claimed in claim 1, wherein UI of said host IDTV content in said dual-screen mode is generated by said interface generator according to said UI abstract description of said host IDTV content and is presented on a screen of said handheld device by said handheld GUI.

9. The system as claimed in claim 1, wherein in said single-screen mode, said interface generator, according to said UI abstract description of said single-screen IDTV input device through said handheld GUI, presents UI on a screen of said handheld device.

10. The system as claimed in claim 1, wherein when said host IDTV content is a computer program, said host IDTV content includes an application logic component, a UI abstraction layer, a host UI adaptation layer, and a remote console adaptation layer.

11. The system as claimed in claim 1, wherein when said IDTV content is a computer program, said IDTV middleware includes a host API and a remote console API.

12. The system as claimed in claim 1, wherein when said host IDTV content is data, said host IDTV content includes markup language data and script, said markup language data includes presentation-irrelevant data and presentation data, and said presentation data describe how to present the combination of said presentation-irrelevant data and said script on both a handheld device remote console and said host GUI, respectively.

13. The system as claimed in claim 12, wherein said IDTV middleware is realized with a content parser, an interpreting engine, a host presentation engine and a remote console presentation engine, said content parser is responsible for loading and delivering said host IDTV content to said interpreting engine, said interpreting engine interprets and maintains said presentation-irrelevant data and executes said script, said host presentation engine presents an interpreted data page on a screen of said host IDTV, and said remote console presentation engine presents said interpreted data page in a remote console form on a handheld device screen.

14. The system as claimed in claim 1, wherein when said host IDTV content is data, said host IDTV content includes markup language data and script, and presentation-irrelevant data and presentation data of said host GUI are mixed in said markup language data.

15. The system as claimed in claim 14, wherein said IDTV middleware is realized with a content parser, a legacy interpreting and rendering engine, and a remote console plugin, said legacy interpreting and rendering engine interprets said presentation-irrelevant data and said presentation-related data of said host GUI, and executes said script, and said remote console plugin turns off the presentation function of said legacy interpreting and rendering engine on said host IDTV, and intercepts internal events of said legacy interpreting and rendering engine and presents said host IDTV content in a remote console form on a handheld device screen.

16. The system as claimed in claim 1, wherein components of said host IDTV apply said server-side remote console control protocol to become a remote console server and allow said handheld device to operate said components.

17. The system as claimed in claim 1, wherein said interface generator parses said UI abstract descriptions, and constructs a handheld UI concrete description according to the context of said handheld device.

18. The system as claimed in claim 1, wherein said client-side remote console control protocol provides a remote console client API that allows said interface generator to call.

19. A method for operating dual-screen interactive digital television (IDTV) realized with a single-screen mode and a dual-screen mode, applicable to a host IDTV and a handheld device, said method comprising:
applying a modality-independent technology to generate user interface (UI) abstract descriptions containing UI functional information without detailed presentation information of a concrete UI according to a DTV content, where said DTV content including a host IDTV content and a handheld IDTV content, said host IDTV content including a computer program or a combination of a computer program and data, said UI abstract descriptions including a UI abstract description of said host IDTV content realized in said dual-screen mode, and a UI abstract description of a single-screen IDTV input device realized in said single-screen mode;
re-directing said UI abstract descriptions to said handheld device; and
arranging said DTV content to execute in either said single-screen mode or said dual-screen mode;
wherein in said dual-screen mode, an AV content of said DTV content is presented on a host GUI of said host IDTV but not on a handheld GUI of said handheld device and UI output information from said host IDTV content is presented on said handheld GUI but not on said host GUI, said host IDTV content is a remote console server with a handheld concrete UI of said handheld device being a remote console when said host IDTV content is a computer program or a combination of a computer program and data, and an IDTV middleware is a remote console server when said host IDTV content is data.

20. The method as claimed in claim 19, wherein said UI abstract descriptions are stored in said handheld IDTV content.

21. The method as claimed in claim 19, wherein said DTV content is chosen from any one combination of at least a host IDTV content, at least a handheld IDTV content, an audio content, and a video content.

22. The method as claimed in claim 19, wherein said UI abstract description of said single-screen IDTV input device is generated before the broadcasting of said DTV content, and is attached to said handheld IDTV content.

23. The method as claimed in claim 19, wherein said UI abstract description of said single-screen IDTV input device is generated by said host IDTV, and is attached to said handheld IDTV content of said DTV content when said host IDTV transmits said handheld IDTV content to said handheld device.

24. The method as claimed in claim 19, wherein said method in said dual-screen mode further includes the steps of:
receiving said handheld IDTV content, translating said UI abstract description of said host IDTV content into a concrete UI of said handheld device, and presenting said concrete UI on a screen of said handheld device; and using said concrete UI on said handheld device to input information to said host IDTV content, and presenting output information from said host IDTV content on said concrete UI of said handheld device.

25. The method as claimed in claim 19, wherein said method in said single-screen mode further includes the steps:

parsing said UI abstract description of said single-screen IDTV input device, and translating said UI abstract description of said single-screen IDTV input device into a concrete UI of said handheld device, said concrete UI being a remote console for said single-screen IDTV input device; and using said concrete UI to input information to said host IDTV content, and presenting output information from said host IDTV content on a screen of said host IDTV.

26. The method as claimed in claim 24, wherein said UI abstract description of said host IDTV content is translated into said concrete UI of said handheld device according to the context of said handheld device.

27. The method as claimed in claim 19, wherein said method uses a server-side remote console control protocol, a client-side remote console control protocol and a multi-layer networking technology to operate on said host IDTV and said handheld device.

28. The method as claimed in claim 19, wherein said UI abstract description of said host IDTV content is automatically generated by a DTV authoring tool during the production of said DTV content.

29. The method as claimed in claim 28, wherein automatic generation of said UI abstract description of said host IDTV content further includes the steps of:

generating a concrete UI of said host IDTV content; and removing detailed presentation information from said concrete UI, and leaving only UI function description and UI presentation hint to obtain said UI abstract description.

* * * * *